United States Patent
Propheter-Hinckley

(10) Patent No.: US 10,781,715 B2
(45) Date of Patent: Sep. 22, 2020

(54) IMPINGEMENT COOLING BAFFLE

(71) Applicant: United Technologies Corporation, Hartford, CT (US)

(72) Inventor: Tracy A. Propheter-Hinckley, Manchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 862 days.

(21) Appl. No.: 14/976,069

(22) Filed: Dec. 21, 2015

(65) Prior Publication Data

US 2017/0175578 A1    Jun. 22, 2017

(51) Int. Cl.
*F01D 25/12*    (2006.01)
*F01D 9/06*    (2006.01)
(Continued)

(52) U.S. Cl.
CPC .............. *F01D 25/12* (2013.01); *F01D 9/02* (2013.01); *F01D 9/065* (2013.01); *F02C 3/04* (2013.01);
(Continued)

(58) Field of Classification Search
CPC . F01D 5/18; F01D 5/183; F01D 5/184; F01D 5/187; F01D 5/188; F01D 5/189;
(Continued)

(56) References Cited

U.S. PATENT DOCUMENTS 2,476,216 A * 7/1949 Polleau .................. F01D 19/00
    248/188.5
3,301,527 A * 1/1967 Kercher .................. F01D 5/189
    415/115
(Continued)

FOREIGN PATENT DOCUMENTS

EP    1219784 A2    7/2002
EP    1626162 A1    2/2006
(Continued)

OTHER PUBLICATIONS

Machine translation of Foreign Patent Document WO 2014/131696 A1 to Ahmad et al. (Sep. 2014), retrieved from Espacenet.com on May 21, 2019. (Year: 2014).*

(Continued)

*Primary Examiner* — Jason H Duger
(74) *Attorney, Agent, or Firm* — Cantor Colburn LLP

(57) ABSTRACT

A component for a gas turbine engine includes a first component end, a second component end and a cavity extending from the first component end to the second component end. A baffle assembly is located in the cavity including a first baffle portion inserted into the cavity and a second baffle portion inserted into the cavity. The first baffle portion overlaps the second baffle portion. A vane for a gas turbine engine includes an outer platform, an inner platform and an airfoil portion extending. A core extends through the airfoil portion. A baffle is positioned in the core and is offset from the core wall. The baffle includes a first baffle portion inserted into the core and a second baffle portion inserted (Continued)

into the core. One of the first baffle portion or the second baffle portion overlaps the other of the first baffle portion or the second baffle portion.

18 Claims, 6 Drawing Sheets

(51) Int. Cl.
    *F01D 9/02*     (2006.01)
    *F01D 5/18*     (2006.01)
    *F02C 3/04*     (2006.01)

(52) U.S. Cl.
    CPC .......... *F01D 5/189* (2013.01); *F05D 2220/32* (2013.01); *F05D 2240/80* (2013.01); *F05D 2260/201* (2013.01); *Y02T 50/676* (2013.01)

(58) Field of Classification Search
    CPC ... F01D 9/02; F01D 9/06; F01D 9/065; F01D 25/12; F01D 2240/80; F01D 2240/126; F01D 2260/37; F01D 2260/201; F02C 3/04; F02C 7/18; F23R 2900/03044; Y02T 50/676

See application file for complete search history.

(56) References Cited

U.S. PATENT DOCUMENTS

| | | | | |
|---|---|---|---|---|
| 3,635,498 A | * | 1/1972 | Patel | .................... F16L 13/0236 285/24 |
| 4,798,515 A | | 1/1989 | Hsia et al. | |
| 5,360,242 A | * | 11/1994 | Argent | ................ E21B 17/0426 228/189 |
| 6,193,465 B1 | * | 2/2001 | Liotta | ..................... B23P 15/04 416/96 A |
| 7,056,083 B2 | * | 6/2006 | Gray | ....................... F01D 5/189 415/115 |
| 2012/0210717 A1 | * | 8/2012 | Baruah | ..................... F23C 9/00 60/742 |
| 2013/0232986 A1 | * | 9/2013 | Stoia | ....................... F02C 7/222 60/776 |
| 2013/0315725 A1 | * | 11/2013 | Uechi | .................... F01D 5/189 415/208.1 |

FOREIGN PATENT DOCUMENTS

| | | |
|---|---|---|
| GB | 2017229 A | 10/1979 |
| WO | 2014131696 A1 | 9/2014 |

OTHER PUBLICATIONS

European Search Report and Written Opinion; European Application No. 16203382.3; European Filing Date: Dec. 12, 2016; dated May 8, 2017.
European Office Action Issued in EP Application No. 16203382.3, dated Jun. 25, 2018, 8 Pages.

\* cited by examiner

IMPINGEMENT COOLING BAFFLE

BACKGROUND

This disclosure relates to gas turbine engines, and more particularly to the provision of cooling air for internal components of gas turbine engines.

Gas turbine engines, such as those used to power modern commercial and military aircraft, generally include a compressor section to pressurize an airflow, a combustor section for burning hydrocarbon fuel in the presence of the pressurized air, and a turbine section to extract energy from the resultant combustion gases. The airflow flows along a gaspath through the gas turbine engine.

Operating temperatures in the turbine section and a high pressure compressor portion of the gas turbine engine often exceed a maximum useful temperature of materials used to form components in those portions of the gas turbine engine, so cooling is provided to many of these components via a flow of lower temperature cooling air drawn from other portions of the gas turbine engine. One cooling scheme utilized is the injection of cooling air along a flowpath surface of the components to form a cooling film at the component surface. In many components, such as turbine vanes, cooling air is directed into an interior of the component and impinged on an inner surface of the component to provide impingement cooling of the component as an alternative or in addition to film cooling.

The cooling airflow is typically flowed through a baffle installed at the interior of the component to direct the impingement cooling airflow toward the inner surface. As component shapes evolve into more complex geometries to meet engine performance requirements, manufacture and installation of the baffles compatible with the complex component shapes and also enabling a required degree of impingement cooling becomes increasing difficult.

SUMMARY

In one embodiment, a component for a gas turbine engine includes a first component end, a second component end and a cavity extending from the first component end to the second component end. A baffle assembly is located in the cavity including a first baffle portion inserted into the cavity and a second baffle portion inserted into the cavity. The first baffle portion overlaps the second baffle portion.

Additionally or alternatively, in this or other embodiments each of the first baffle portion and the second baffle portion include a plurality of baffle openings therethrough to direct a cooling airflow through the plurality of baffle openings to impinge on a cavity wall.

Additionally or alternatively, in this or other embodiments the first baffle portion is secured to the second baffle portion.

Additionally or alternatively, in this or other embodiments a press fit condition exists between the first baffle portion and the second baffle portion.

Additionally or alternatively, in this or other embodiments one or more guide tabs are positioned at the second baffle portion to guide the first baffle portion over the second baffle portion Additionally or alternatively, in this or other embodiments a cover is located at one of the first baffle portion or the second baffle portion to at least partially block the cooling airflow from passing therethrough.

Additionally or alternatively, in this or other embodiments the first baffle portion includes a retention flange to retain the first baffle portion at the first component end.

In another embodiment, a vane for a gas turbine engine includes an outer platform, an inner platform and an airfoil portion extending between the outer platform and the inner platform. A core defined by a core wall extends through the airfoil portion from the outer platform to the inner platform. A baffle is positioned in the core and is offset from the core wall. The baffle includes a first baffle portion inserted into the core and a second baffle portion inserted into the core. One of the first baffle portion or the second baffle portion overlaps the other of the first baffle portion or the second baffle portion.

Additionally or alternatively, in this or other embodiments each of the first baffle portion and the second baffle portion includes a plurality of baffle openings therethrough to direct a cooling airflow through the plurality of baffle openings to impinge on a core wall.

Additionally or alternatively, in this or other embodiments the first baffle portion is secured to the second baffle portion.

Additionally or alternatively, in this or other embodiments a press fit condition exists between the first baffle portion and the second baffle portion.

Additionally or alternatively, in this or other embodiments one or more guide tabs are located at one of the first baffle portion or the second baffle portion to guide the other of the first baffle portion or the second baffle portion thereover.

Additionally or alternatively, in this or other embodiments a cover is positioned at one of the first baffle portion or the second baffle portion to at least partially block the cooling airflow from passing therethrough.

Additionally or alternatively, in this or other embodiments the first baffle portion includes an outer retention flange to retain the first baffle portion at the outer platform.

Additionally or alternatively, in this or other embodiments the second baffle portion includes an inner retention flange to retain the second baffle portion at the inner platform.

Additionally or alternatively, in this or other embodiments a baffle offset between the baffle and the core wall is substantially constant along the airfoil portion.

Additionally or alternatively, in this or other embodiments the baffle offset is in the range of 0.010 inches and 0.250 inches.

In yet another embodiment, a gas turbine engine includes a compressor section, a combustor section, a turbine section and a component including a first component end, a second component end, and a cavity extending from the first component end to the second component end. A baffle assembly is located in the cavity including a first baffle portion inserted into the cavity and a second baffle portion inserted into the cavity. The first baffle portion overlaps the second baffle portion.

Additionally or alternatively, in this or other embodiments each of the first baffle portion and the second baffle portion includes a plurality of baffle openings therethrough to direct a cooling airflow through the plurality of baffle openings to impinge on a cavity wall.

Additionally or alternatively, in this or other embodiments the first baffle portion is secured to the second baffle portion.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
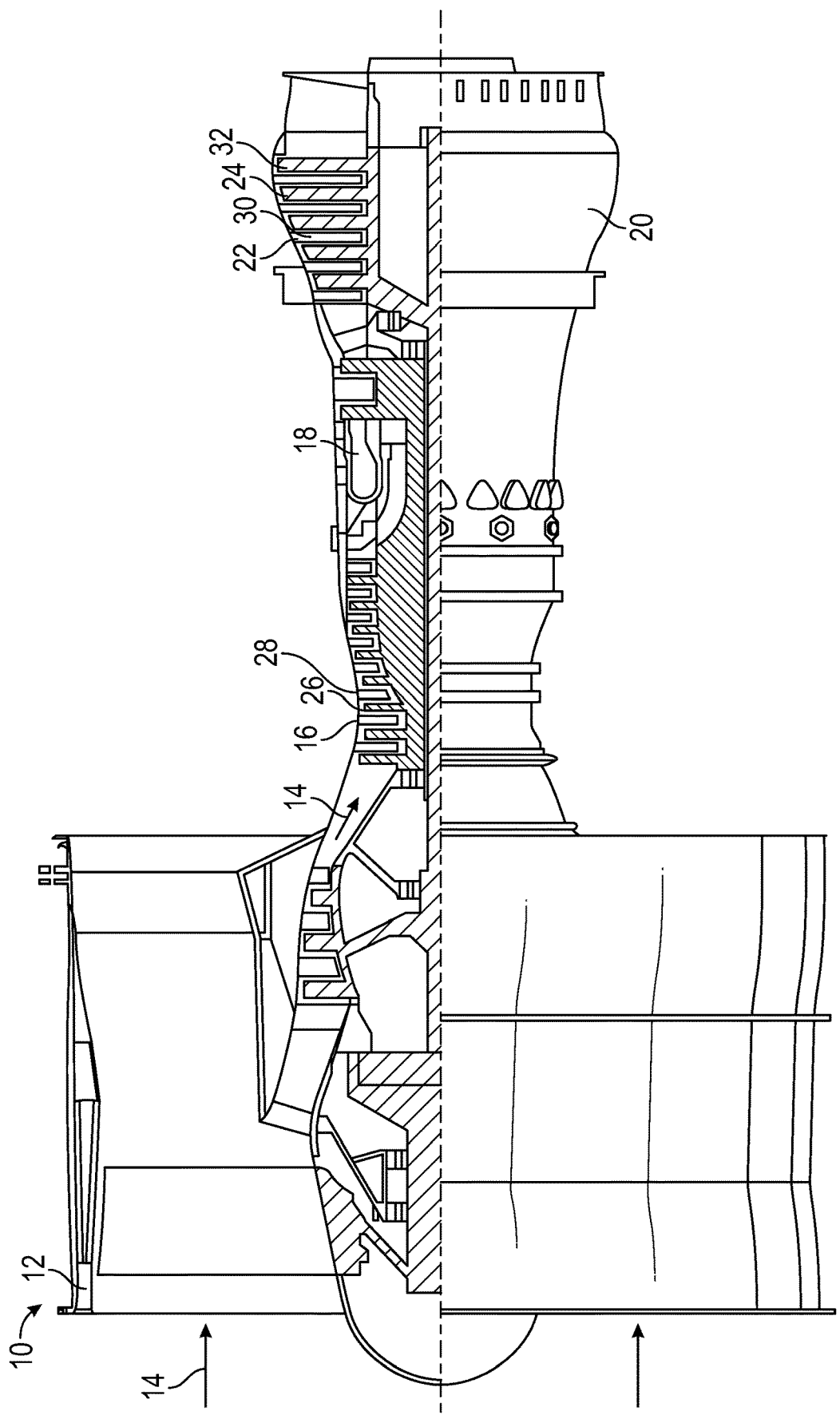
FIG. 1 illustrates a schematic cross-sectional view of an embodiment of a gas turbine engine.

FIG. 1 is a schematic illustration of a gas turbine engine 10. The gas turbine engine generally has a fan 12 through which ambient air is propelled in the direction of arrow 14, a compressor 16 for pressurizing the air received from the fan 12 and a combustor 18 wherein the compressed air is mixed with fuel and ignited for generating combustion gases.

The gas turbine engine 10 further comprises a turbine section 20 for extracting energy from the combustion gases. Fuel is injected into the combustor 18 of the gas turbine engine 10 for mixing with the compressed air from the compressor 16 and ignition of the resultant mixture. The fan 12, compressor 16, combustor 18, and turbine 20 are typically all concentric about a common central longitudinal axis of the gas turbine engine 10. In some embodiments, the compressor 16 includes one or more compressor rotors 26 and one or more compressor stators 28. Likewise, the turbine 20 includes one or more turbine stators 22 including a plurality of turbine vanes 30 and one or more turbine rotors 24 including a plurality of turbine blades 32. While the description below relates to a turbine vane 30, one skilled in the art will readily appreciate that the present disclosure may be readily applied to other components, such as turbine blades 32, compressor rotors 26, compressor stators 28, or other components utilizing impingement cooling via a baffle.

Figure 2:
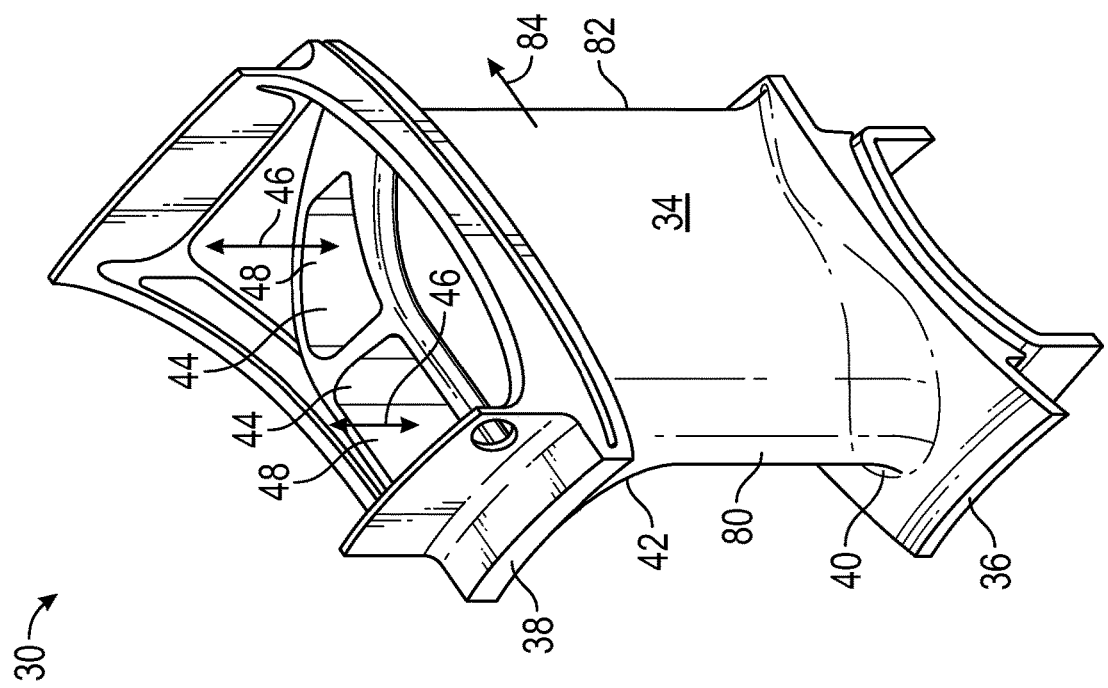
FIG. 2 illustrates a perspective view of an embodiment of a turbine vane for a gas turbine engine.

Referring now to FIG. 2, an embodiment of a turbine vane 30 is shown in more detail. The turbine vane 30 includes an airfoil portion 34 extending between an inner platform 36 and an outer platform 38. The airfoil portion 34 has a leading edge 80 and a trailing edge 82, relative to a gas flow direction 84 past the airfoil portion 34. When the turbine vane 30 is installed in the gas turbine engine 10, the inner platform 36 is positioned nearer the engine axis, relative to the outer platform 38. An inner fillet 40 connects the airfoil portion 34 to the inner platform 36 and, similarly, an outer fillet 42 connects the airfoil portion 34 to the outer platform 38. Further, one or more cavities, or cores 44 extend through the airfoil portion 34 and are accessible via at least one of the inner platform 36 and/or outer platform 38. The cores 44 are utilized to flow a cooling airflow 46 therethrough utilized to cool the turbine vane 30 and other components of the gas turbine engine 10.

Figure 3:
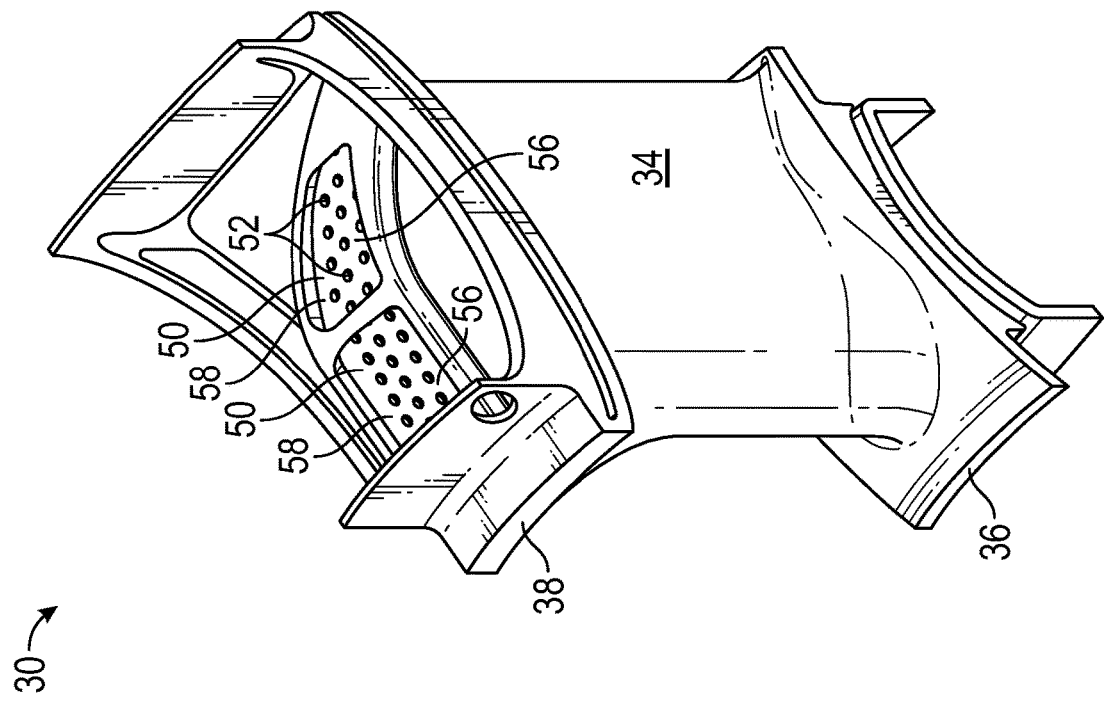
FIG. 3 illustrates a perspective view of an embodiment of a turbine vane including an impingement cooling baffle.
Figure 4:
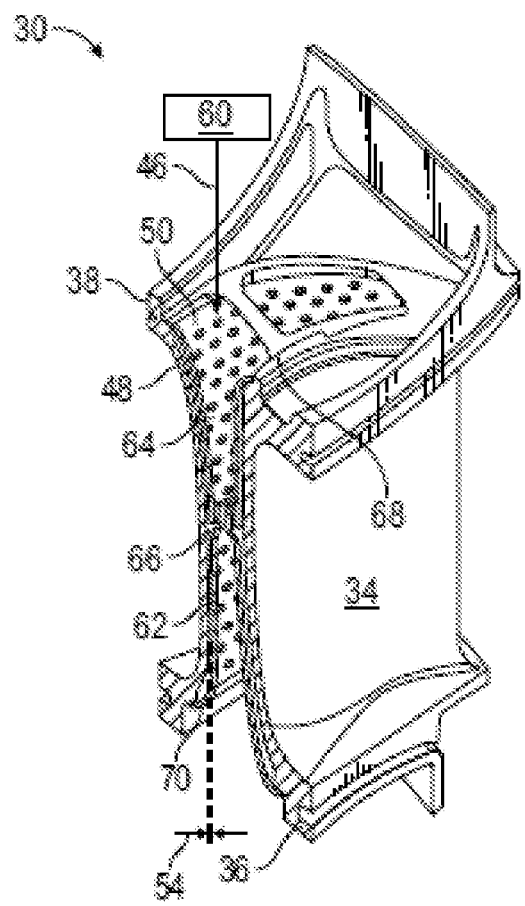
FIG. 4 illustrates a cross-sectional view of an embodiment of a turbine vane including an impingement cooling baffle.

One method of utilizing the cooling airflow 46 is to impinge the cooling airflow at a core wall 48. Referring now to FIGS. 3 and 4, to facilitate impingement at the core wall 48, one or more baffles 50 are installed in the core 44. In some embodiments, the baffle 50 is formed from a metal material such as steel, nickel or aluminum, but it is to be appreciated that other materials may be utilized. The baffle 50 includes a plurality of baffle openings 52, and as shown in FIG. 4, is offset from the core wall 48 by a baffle offset 54 and forms a baffle plenum 56 defined by opposing baffle walls 58. In some embodiments, the baffle offset 54 is between about 0.010 inches and 0.250 inches. The baffle walls 58 preferably follow contours of the airfoil portion 34 to increase cooling benefits from impingement. The placement of the baffle 50 in the core 44 and the baffle openings 52 allows the cooling airflow 46, directed from a cooling airflow source 60, into the baffle plenum 56 via the outer platform 38 and/or the inner platform 36, to be directed through the baffle openings 52 and impinge on the core wall 48.

In some turbine vanes, the airfoil portion shape and/or large inner fillets and outer fillets, make it difficult to install a baffle that extends an entire length of the airfoil portion from the inner platform to the outer platform, while still maintaining the desired baffle offset 54. Thus, the baffle 50 includes an inner baffle portion 62 installed via the inner platform 36 and an outer baffle portion 64 installed via the outer platform 38, with a central joint 66 where the inner baffle portion 62 and the outer baffle portion 64 meet. This allows the baffle 50 to follow the core walls 48 even when the core walls 48 diverge such as at the inner fillet 40 and the outer fillet 42. As shown in FIG. 4, the outer baffle portion 64 may include an outer retention flange 68 at the outer platform 38 to position the outer baffle portion 64 at the outer platform 38. Similarly, an inner retention flange 70 may be included at the inner baffle portion 62 to retain the inner baffle portion 62 at the inner platform 36.

Figure 5:
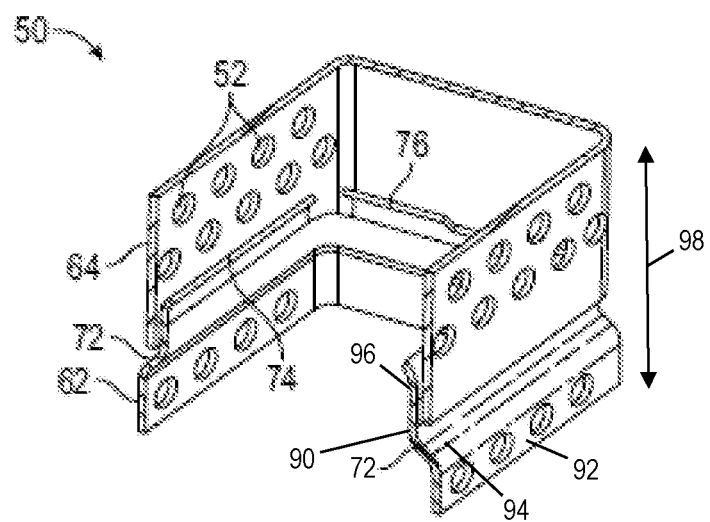
FIG. 5 illustrates a cross-sectional view of an embodiment of a joint between portions of an impingement baffle.

The central joint 66 may be configured to be, for example, a press fit joint or a brazed joint, though a brazed joint will require a thermal growth assessment to ensure the baffle 50 can withstand a thermal mismatch between the baffle 50 and the turbine vane 30. An embodiment of the central joint 66 is shown in more detail in FIG. 5. In the embodiment of FIG. 5, the outer baffle portion 64 overlaps the inner baffle portion 62, with a baffle recess 72 in the inner baffle portion 62 facilitating the overlap, while allowing for a consistent baffle offset 54 along the baffle 50 across the central joint 66. The inner baffle portion 62 may further include one or more guide tabs 74 at an outer end 76 of the inner baffle portion 62 to guide the outer baffle portion 64 over the inner baffle portion 62 or alternatively to guide the inner baffle portion 62 inside of the outer baffle portion 64 during assembly. Though in the embodiment of FIG. 5 the outer baffle portion 64 overlaps the inner baffle portion 62, other embodiments may be configured such that the inner baffle portion 62 overlaps the outer baffle portion 64. Once assembled, in some embodiments the central joint 66 is brazed to maintain the relative position of the inner baffle portion 62 and the outer baffle portion 64. In other embodiments, the central joint 66 is a press fit or slip fit, allowing relative motion between the inner baffle portion 62 and the outer baffle portion 64, which may be due to thermal growth of the turbine vane 30 relative to the baffle 50. The second baffle portion 62 includes a recessed portion 90 facilitating the overlap and a second baffle body portion 92 adjacent to the recessed portion 90, the recessed portion 90 having a first part 94 and a second part 96, the first part 94 curving inwardly from the second baffle body portion 92 toward an interior of the baffle plenum. The second part 96 extends from the first part 94 along the radial direction 98, wherein the one or more guide tabs 74 curve inwardly from the second part 96 of the recessed portion 90.

Figure 6:
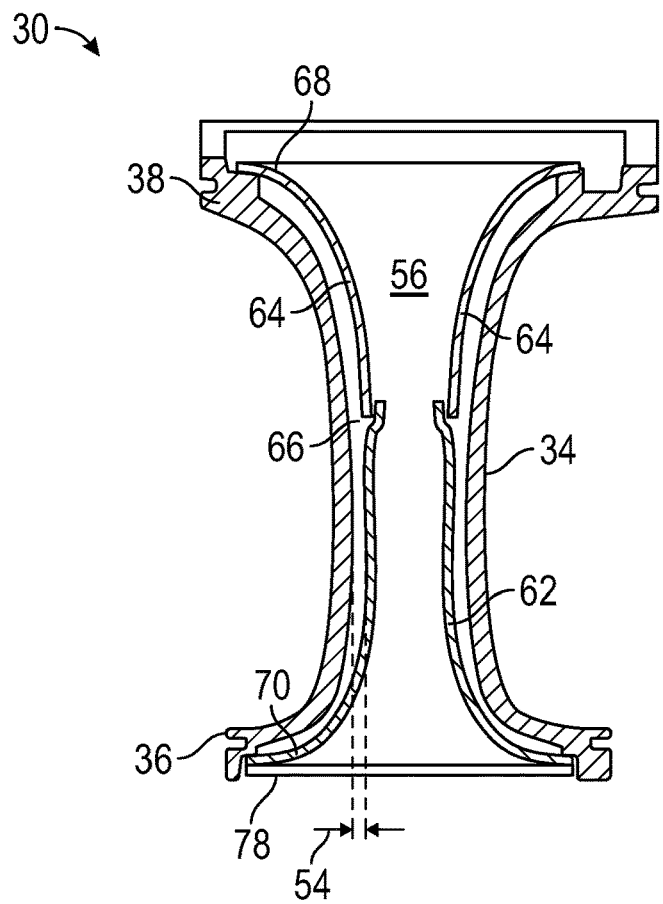
FIG. 6 illustrates a cross-sectional view of an embodiment of an impingement baffle including a cover.

Referring now to FIG. 6, in some embodiments, it is desired to further regulate the flow of cooling airflow 46 through the turbine vane 30. This one of the outer baffle portion 64 or the inner baffle portion 62 may have a cover 78 positioned therein to prevent cooling airflow 46 from flowing entirely through the baffle plenum 56. In such embodiments, the cooling airflow 46 may be unidirectional, flowing into the baffle plenum 56 through only one of the outer platform 38 or the inner platform 36 and out of the baffle plenum 56 through the baffle openings 52, or may be bi-directional, flowing into the baffle plenum 56 through both the outer platform 38 and the inner platform 36, and out through baffle openings 52.

Figure 7A:
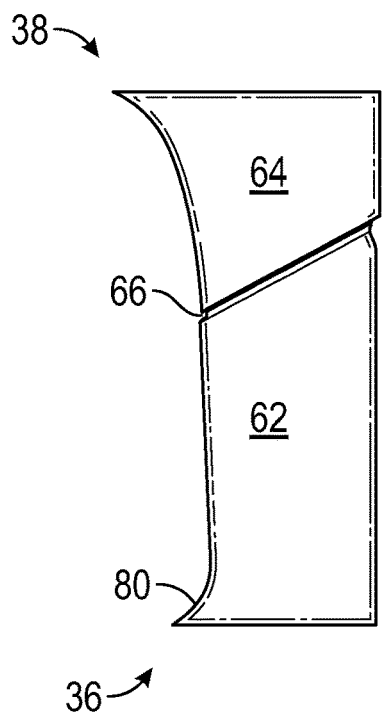
FIGS. 7a-7f illustrate embodiments of arrangements of impingement baffle portions.
Figure 7B:
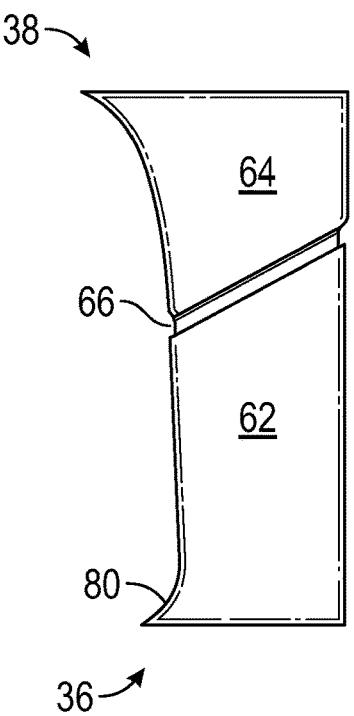
Figure 7C:
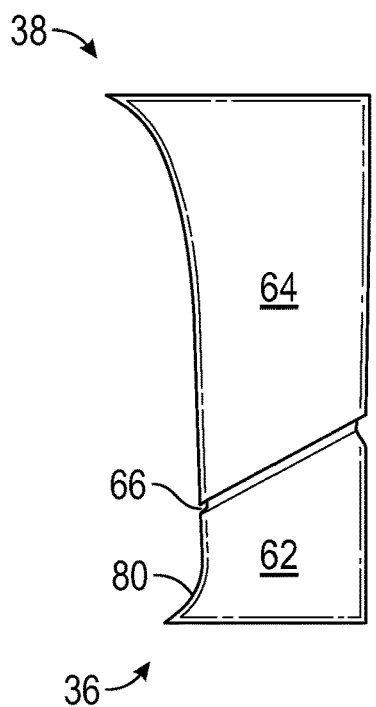
Figure 7D:
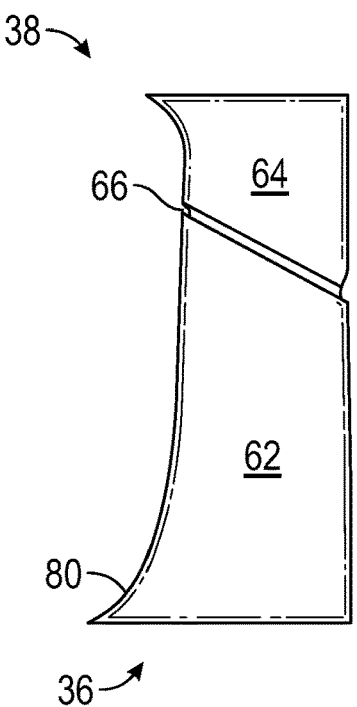
Figure 7E:
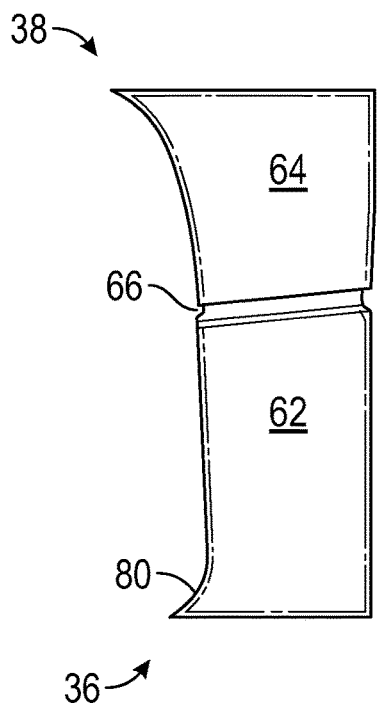
Figure 7F:
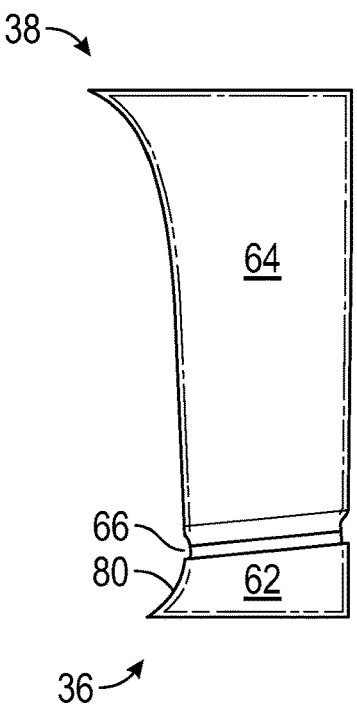

Alternative embodiments of baffle 50 arrangements are shown in FIGS. 7a-7f, with the baffle openings 52 omitted for clarity. In the embodiment of FIG. 7a the central joint 66 is canted toward an inner platform 36 leading edge 80 with the outer baffle portion 64 overlapping the inner baffle potion 62. In the embodiment of FIG. 7b, the central joint is canted similarly to that of FIG. 7a, but the inner baffle portion 62 overlaps the outer baffle portion 64. In the embodiment of FIG. 7c, the central joint 66 is again similarly canted to that of FIG. 7a, but the central joint 66 is located nearer to the inner platform 36. In the embodiment of FIG. 7d, the central joint 66 is canted toward the outer platform 38 leading edge 80. Finally, in the embodiments of FIGS. 7e and 7f, the central joint 66 is not canted but is located near midspan of the airfoil portion 34 in the embodiment of FIG. 7e, and near the inner platform 36 in the embodiment of FIG. 7f.

Figure 8:
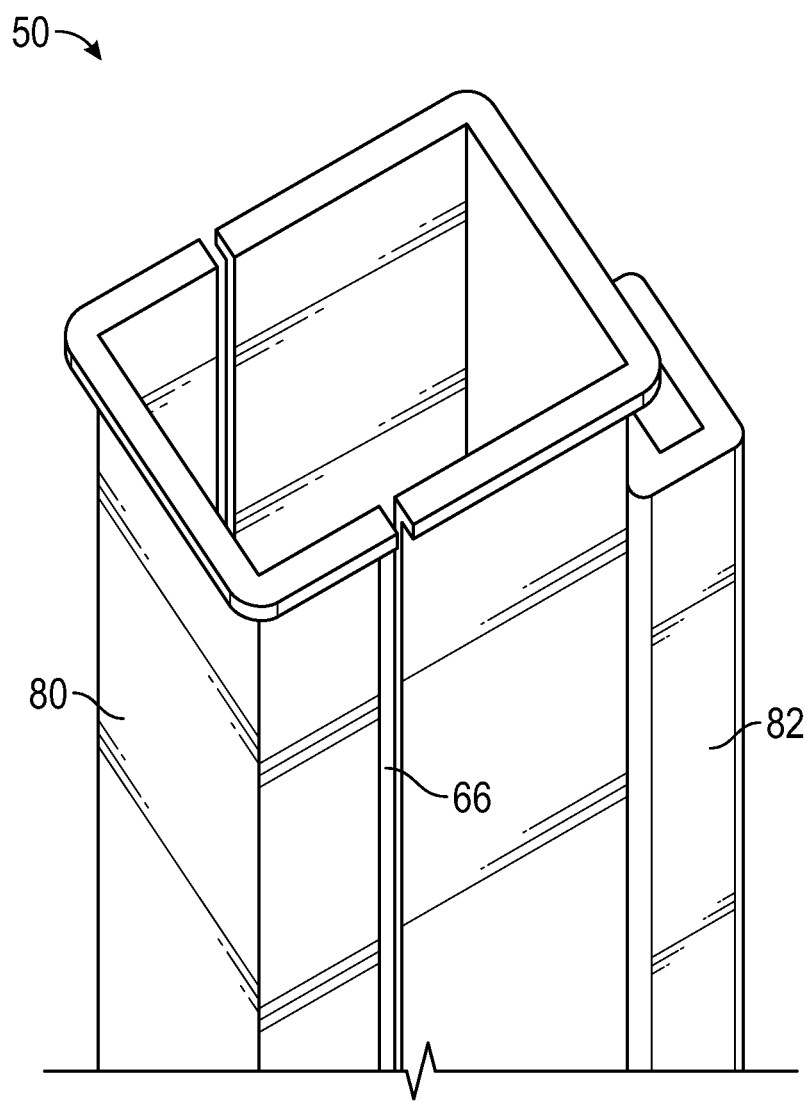
FIG. 8 illustrates another embodiment of a baffle with a substantially radially extending central joint.

While the embodiments shown FIGS. 7a-7f illustrate baffles with an outer baffle portion 64 and an inner baffle portion 62 with a substantially axially-extending central joint 66, another embodiment is shown in FIG. 8. In the embodiment of FIG. 8, the baffle 50 includes a first axial baffle portion 80 and a second axial baffle portion 82, which are joined at a substantially radially-extending central joint 66. Such an alternative embodiment allows for installation of baffles 50 in components where the core walls 48 converge at, for example, the outer platform 38 and/or the inner platform 36, and still have the ability to maintain a desired baffle offset 54.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A component of a gas turbine engine, the component comprising:
   a first component end;
   a second component end, a radial direction defined as extending from the first component end to the second component end;
   an airfoil defining a cavity that extends from the first component end to the second component end; and
   a baffle assembly located in the cavity including:
      a first baffle portion inserted into the cavity; and
      a second baffle portion inserted into the cavity, a baffle plenum defined within the first baffle portion and the second baffle portion;
   the first baffle portion overlapping an exterior surface of the second baffle portion at an overlap along the radial direction, wherein one or more guide tabs are disposed at an outer end of the second baffle portion and are configured to guide the first baffle portion over the second baffle portion;
   wherein the second baffle portion includes a recessed portion facilitating the overlap and a second baffle body portion adjacent the recessed portion, the recessed portion having a first part and a second part, the first part curving inwardly from the second baffle body portion toward an interior of the baffle plenum, the second part extending from the first part and along the radial direction, wherein the one or more guide tabs curve inwardly from the second part of the recessed portion.

2. The component of claim 1, wherein each of the first baffle portion and the second baffle portion include a plurality of baffle openings therethrough to direct a cooling airflow to impinge on a cavity wall.

3. The component of claim 1, wherein the first baffle portion is secured to the second baffle portion.

4. The component of claim 1, further comprising a press fit condition between the first baffle portion and the second baffle portion.

5. The component of claim 1, further comprising a cover disposed at one of the first baffle portion or the second baffle portion to at least partially block a cooling airflow from passing therethrough.

6. The component of claim 1, wherein the first baffle portion includes a retention flange to retain the first baffle portion at the first component end.

7. The component of claim 1, wherein the overlap between the first baffle portion and the second baffle portion facilitates a central joint.

8. A vane of a gas turbine engine, the vane comprising:
   a first component end;
   a second component end, a radial direction defined as extending from the first component end to the second component end;
   an airfoil defining a cavity that extends from the first component end to the second component end; and
   a baffle assembly located in the cavity including:
      a first baffle portion inserted into the cavity; and
      a second battle portion inserted into the cavity, a battle plenum defined within the first battle portion and the second baffle portion;
   the first baffle portion overlapping an exterior surface of the second baffle portion at an overlap along the radial direction, wherein one or more guide tabs are disposed at an outer end of the second baffle portion and are configured to guide the first baffle portion over the second baffle portion;
   wherein the second baffle portion includes a recessed portion facilitating the overlap and a second baffle body portion adjacent the recessed portion, the recessed portion having a first part and a second part, the first part curving inwardly from the second baffle body portion toward an interior of the baffle plenum, the second part extending from the first part and along the radial direction, wherein the one or more guide tabs curve inwardly from the second part of the recessed portion.

9. The vane of claim 8, wherein each of the first baffle portion and the second baffle portion includes a plurality of baffle openings therethrough to direct a cooling airflow to impinge en a core wall.

10. The vane of claim 8, wherein the first baffle portion is secured to the second baffle portion.

11. The vane of claim 8, further comprising a press fit condition between the first baffle portion and the second baffle portion.

12. The vane of claim 8, further comprising a cover disposed at one of the first baffle portion or the second baffle portion to at least partially block a cooling airflow from passing therethrough.

13. The vane of claim 8, further comprising a baffle offset.

14. The vane of claim 13, wherein the baffle offset is between 0.010 inches and 0.250 inches.

15. The vane of claim 8, wherein the overlap between the first baffle portion and the second baffle portion facilitates a central joint.

16. A gas turbine engine, comprising:
 a compressor section;
 a combustor section;
 a turbine section; and
 a component including:
  a first component end;
  a second component end, a radial direction defined as extending from the first component end to the second component end;
  an airfoil defining a cavity that extends from the first component end to the second component end; and
  a baffle assembly located in the cavity including:
   a first baffle portion inserted into the cavity; and
   a second baffle portion inserted into the cavity, a baffle plenum defined within the first baffle portion and the second baffle portion;
  the first baffle portion overlapping an exterior surface of the second baffle portion at an overlap along the radial direction, wherein one or more guide tabs are disposed at an outer end of the second baffle portion and are configured to guide the first baffle portion over the second baffle portion;
  wherein the second baffle portion includes a recessed portion facilitating the overlap and a second baffle body portion adjacent the recessed portion, the recessed portion having a first part and a second part, the first part curving inwardly from the second baffle body portion toward an interior of the baffle plenum, the second part extending from the first part and along the radial direction, wherein the one or more guide tabs curve inwardly from the second part of the recessed portion.

17. The gas turbine engine of claim 16, wherein each of the first baffle portion and the second baffle portion includes a plurality of baffle openings therethrough to direct a cooling airflow to impinge on a cavity wall.

18. The gas turbine engine of claim 16, wherein the first baffle portion is secured to the second baffle portion.

* * * * *